United States Patent
Bel

(10) Patent No.: US 7,474,148 B2
(45) Date of Patent: Jan. 6, 2009

(54) AMPLIFIER COMPRISING AN ELECTRONIC TUBE PROVIDED WITH COLLECTORS BIASED BY AT LEAST TWO DC BIAS SOURCES

(75) Inventor: Claude Bel, Maxilly (FR)

(73) Assignee: Thales, Neuilly-sur-Seine (FR)

( * ) Notice: Subject to any disclaimer, the term of this patent is extended or adjusted under 35 U.S.C. 154(b) by 82 days.

(21) Appl. No.: 10/571,113

(22) PCT Filed: Oct. 8, 2004

(86) PCT No.: PCT/EP2004/052484

§ 371 (c)(1),
(2), (4) Date: Mar. 8, 2006

(87) PCT Pub. No.: WO2005/028586

PCT Pub. Date: Mar. 31, 2005

(65) Prior Publication Data

US 2007/0030058 A1  Feb. 8, 2007

(30) Foreign Application Priority Data

Oct. 10, 2003  (FR)  .................. 03 11904

(51) Int. Cl.
*H01J 23/027*  (2006.01)
(52) U.S. Cl. .................. 330/45; 315/5.37; 315/5.38
(58) Field of Classification Search ................ 315/5.38, 315/5.37, 5.39, 3.5; 330/45
See application file for complete search history.

(56) References Cited

U.S. PATENT DOCUMENTS

| | | | |
|---|---|---|---|
| 3,644,778 A * | 2/1972 | Mihran et al. ............... | 315/5.38 |
| 4,101,804 A * | 7/1978 | Carlsson ..................... | 315/3.5 |
| 5,286,941 A | 2/1994 | Bel | |
| 5,568,014 A | 10/1996 | Aoki et al. | |
| 6,380,803 B2 * | 4/2002 | Symons ....................... | 330/45 |

* cited by examiner

*Primary Examiner*—Benny T. Lee
(74) *Attorney, Agent, or Firm*—Oblon, Spivak, McClelland, Maier & Neustadt, P.C.

(57) ABSTRACT

An amplifier including an electronic tube with an axial electron beam, provided with a cathode and at least two collectors, and at least two sources of DC voltage. Each collector is connected to a DC voltage source having a potential difference such that, the further the collector is from the cathode, the lower the potential difference between this collector and the cathode. The DC voltage sources are connected together at a common point situated at the collector whose potential difference with the cathode is the lower but not zero.

17 Claims, 3 Drawing Sheets

AMPLIFIER COMPRISING AN ELECTRONIC TUBE PROVIDED WITH COLLECTORS BIASED BY AT LEAST TWO DC BIAS SOURCES

BACKGROUND OF THE INVENTION

1. Field of the Invention

The invention relates to an amplifier that comprises an electronic tube with an axial electron beam and voltage sources; the electron tube comprises at least two collectors, each collector being connected to a voltage source.

The field of the invention is that of the power amplification of UHF signals, in particular the amplification of analog and digital television signals from terrestrial transmitters, by means of vacuum tubes comprising an axial electron beam.

A vacuum tube uses the principle of the interaction between an electron beam and an electromagnetic wave in order to transfer to the wave a part of the power contained in the electron beam, so as to obtain at the output of the tube a wave of higher power than that of the wave injected at the input of the tube.

Several categories of vacuum tube exist. In traveling wave tubes, or TWTs, and klystrons, the electron beam is modulated in velocity. In inductive output tubes, or IOTs, the electron beam is modulated in density.

The principle of this interaction applied to an IOT tube, shown in FIG. 1, will be described.

An IOT tube comprises an elongated vacuum envelope composed, in part, of several insulation ceramics 23a, 23b, 23c, 23d, with an electron gun at a first end emitting an electron beam 12 and, at a second end, a first collector 14a and a second collector 14b. The electron gun comprises a cathode 16 that emits the electrons and a grid 18 that controls the flux of electrons as a function of the voltage applied to the grid 18.

The signal to be amplified, of power Pe, is injected between the cathode 16 and the grid 18 and thus modulates the voltage on the grid. The electron beam 12 crossing the grid is then modulated in density by the grid and the electrons are emitted in the form of packets; the time interval between two packets is equal to the period of the signal. The beam 12, shown in the form of packets of electrons, is substantially cylindrical over almost the whole length of the tube between the cathode 16 and the collectors 14a and 14b. This cylindrical form is obtained due, on the one hand, to the shape of the cathode 16, of the anode 24 and of the grid 18 and, on the other, due to an axial magnetic field that keeps the electrons close to the axis 10 of the tube.

A packet of electrons coming from the grid 18 is accelerated before entering a drift tube 20 then into an interaction gap situated between two interaction electrodes 22a, 22b; this interaction gap is connected to a primary output cavity 26 in which the interaction gap generates an electric field. When another packet of electrons reaches this interaction gap, the packet of electrons meets this electric field which slows it down. During this slowing, the kinetic energy of the electrons is converted into electromagnetic or microwave energy, in other words into output power Ps that is directed toward the application, for example via a coaxial feed through an insulator 25.

For a television signal, the power efficiency is generally of the order of 20 to 40%: it represents the part of the power of the electron beam converted into power in the amplified signal.

The remaining power in the electron beam, after its passage through the primary output cavity 26, is subsequently dissipated in the collector. The electrons then bombard the walls of the collector and transform their kinetic energy into heat.

The electrons that reach the collector have very variable energy levels. In order to improve the power efficiency of these tubes, the collector is divided into two collectors 14a and 14b that are electrically isolated from one another; each of these collectors has a potential applied to it that corresponds to one of the energy levels of the electrons. The second collector 14b has a lower potential applied to it than the first collector 14a, with respect to the cathode 16, in order to slow down the electrons that impact the second collector 14b and thus reduce the energy lost in the form of heat. An efficiency up to three times higher than the efficiency of a conventional tube can thus be obtained.

2. Description of the Related Art

Tubes comprising more than two collectors have already been produced as have tubes comprising a repelling electrode at the back end of the collector, this electrode generally being connected to the cathode.

The collector 14b is connected to the positive pole 28 of a DC voltage source 30, for example of 26 kV. The negative pole 32 of the DC voltage source 30 is connected to the cathode 16.

The collector 14a is connected to the positive pole 34 of a DC voltage source 36, for example of 34 kV. The negative pole of the DC voltage source 36, common to that of the voltage source 30, is also connected to the cathode 16. The two sources therefore have a common point 32 situated at the cathode. The output cavity 26 is also connected to the positive pole 34 of the DC voltage source 36, if required via a measurement shunt between ground 17 and the casing of the tube that comprises the anode 24 and the two interaction electrodes 22a, 22b; this measurement shunt allows the current intercepted by the body to be measured. The output cavity 26 is connected to ground.

A current I of a few Amps (for example 2.5 A) coming from the cathode 16 is obtained in the electron beam 12.

According to this configuration, two voltage sources 30 and 36 of over 26 kV are used, which are bulky and costly given the value of their voltage, the distances necessary for their isolation and also their respective powers.

Furthermore, the potential difference between the two collectors 14a and 14b, also called the depression voltage, must not exceed 12 kV in order not to damage the tube, especially the ceramic 23a situated between the two collectors. However, in this type of voltage source, when one of the two collectors 14a, 14b is rapidly interrupted by the action of the safety systems or turns on faster than the other during power-up, a differential voltage that can reach 34 kV is generated between the two collectors 14a and 14b causing, possibly irreversible, damage. The necessity for synchronizing these voltage sources makes this configuration very constraining.

SUMMARY OF THE INVENTION

One important goal of the invention is therefore to overcome these drawbacks by modifying the manner of supplying the collectors and the cathode.

In order to achieve this goal, one subject of the invention is an amplifier comprising an electron tube with axial electron beam, provided with a cathode and at least two collectors, the amplifier also comprising at least two sources of DC voltage, each collector being connected to a DC voltage source having a potential difference such that, the further the collector is from the cathode, the lower the potential difference between this collector and the cathode, characterized in that the DC voltage sources are connected together at a common point situated at the collector whose potential difference with the cathode is the lower but not zero.

This configuration thus allows sources of lower voltage value than in the prior art to be used and the size and cost of the voltage sources to be minimized.

Moreover, it is no longer required to synchronize the power-up and the shut-down operations of the voltage sources since it is not possible for the potential difference between the collectors to exceed that of the voltage source of low value. This improves the reliability of this type of equipment and preserves the tube.

According to one feature of the invention, the voltage sources are variable as shown in FIG. 4.

Preferably, the voltage source (or sources), defining a depression voltage between two collectors, is a current/voltage-limited voltage source. The use of this current/voltage-limited voltage source is especially recommended for the amplification of signals of variable mean power as in the case of analog television.

Another subject of the invention is a transmitter comprising such an amplifier.

BRIEF DESCRIPTION OF THE DRAWINGS

Other features and advantages of the invention will become apparent upon reading the detailed description that follows, presented by way of nonlimiting example and with reference to the appended drawings, in which.

From one figure to another, the same references are used to denote the same elements and may not be described in detail for all drawing figures.

DETAILED DESCRIPTION OF THE PREFERRED EMBODIMENTS

Figure 2:
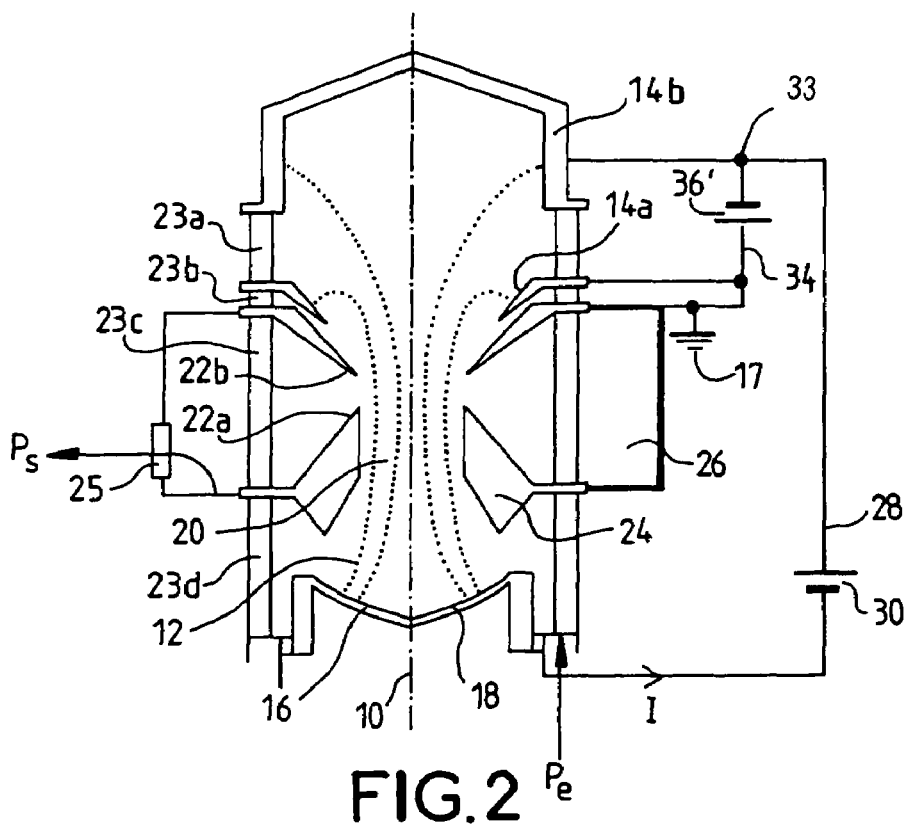
FIG. 2 shows schematically an amplifier with an inductive output electronic tube comprising two collectors and with voltage sources disposed according to the invention.

FIG. 2 shows an exemplary embodiment of an amplifier implementing the invention; it comprises an inductive output electron tube with at least two collectors. It comprises two collectors 14a and 14b in the example in the figure. The invention may also be applied to traveling wave tubes or klystrons and, more generally, to any electron tube with an axial electron beam.

The collector 14b is connected to the positive pole 28 of a DC voltage source 30, for example of 26 kV. The negative pole of the DC voltage source 30 is connected to the cathode 16.

The collector 14a is connected to the positive pole 34 of a DC voltage source 36', for example of 8 kV. The negative pole of this voltage source 36' is connected to the collector 14b; it is in series with the voltage source 30. The common point 33 of these two voltage sources 36' and 30 is at the collector 14b, in other words at the collector that is the farthest from the cathode. The output cavity 26 is also connected to the positive pole 34 of the DC voltage source 36', if necessary via a measurement shunt.

It can be seen that an overall voltage source for the collector 14a of 26 kV+8 kV equaling 34 kV is indeed obtained. This configuration thus allows a voltage source of 26 kV and a voltage source of low value, for example 8 kV, to be used instead of the voltage sources of 34 kV and 26 kV used in the example shown in FIG. 1. The low value of the voltage source 36' allows a compact model to be used which minimizes the size of new transmitters and makes the incorporation of the tube into existing transmitters possible at a lower cost.

Figure 1:
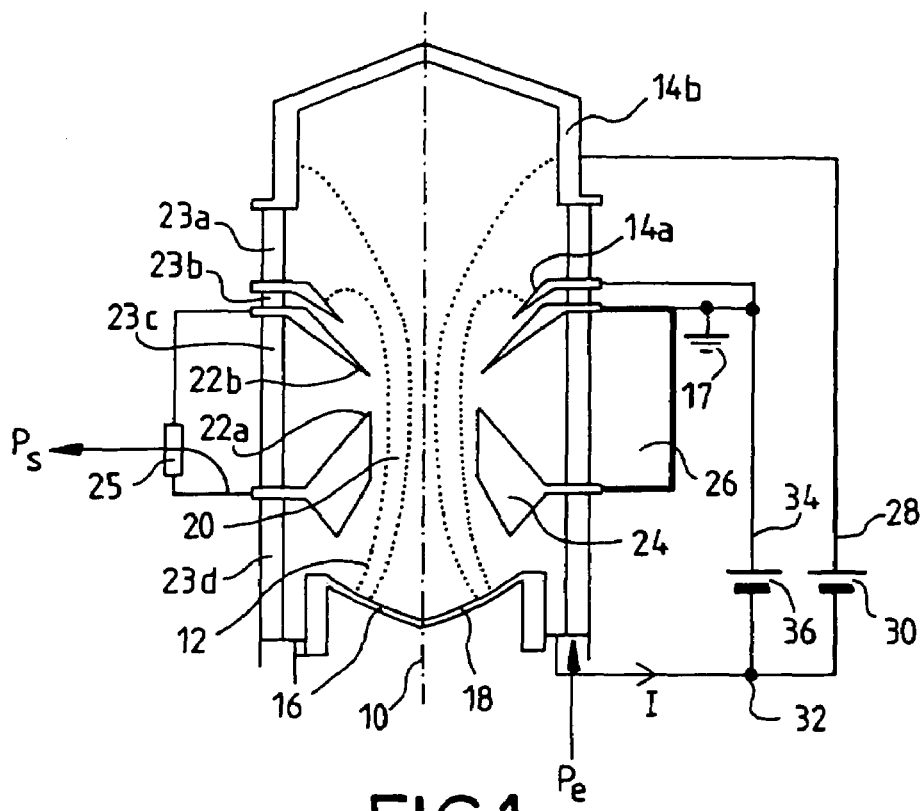
FIG. 1, already described above, shows schematically an amplifier with an inductive output electronic tube comprising two collectors and with voltage sources disposed according to the prior art.

In addition, the potential difference between the two collectors 14a and 14b, in other words the depression voltage, cannot exceed the voltage of this source 36', here 8 kV, whereas it could reach 34 kV in the example in FIG. 1. Indeed, when the voltage source 30 is turned off, the depression voltage is that of the voltage source 36', equal to 8 kV, and when the voltage source 36' is turned off, the depression voltage is zero. Therefore, it is no longer required to synchronize the power-up and shut-down operations of the voltage sources since it is not possible for the potential difference between the collectors exceed that of the source of low voltage value. This improves the reliability of this type of equipment and prolongs the life of the tube.

A current/voltage-limited voltage source is preferably used for this source of low voltage value 36'. A current/voltage-limited voltage source is a stabilized and bounded voltage source with both a voltage setpoint and a current setpoint: the voltage source delivers the highest possible voltage such that at least one of these setpoints is reached. Thus, depending on the maximum current allowed by the collector 14a, a current/voltage-limited voltage source is used that prevents an overdissipation of this collector. The use of this current/voltage-limited voltage source is especially recommended for the amplification of signals with variable mean power as in the case of analog television. The reason for this is that, in this case, the amplitude modulation of the analog signal carrier leads to a modulation of the current of the signal to be amplified which effects the current obtained in this collector 14a.

In the case of a fold-back of the voltage source 36', in other words in the case of a fold-back of the depression voltage, the voltage source 30 is preferably feedback controlled by a setpoint established by the cathode 16—ground 17 voltage measurement in order to keep this voltage constant.

Figure 3:
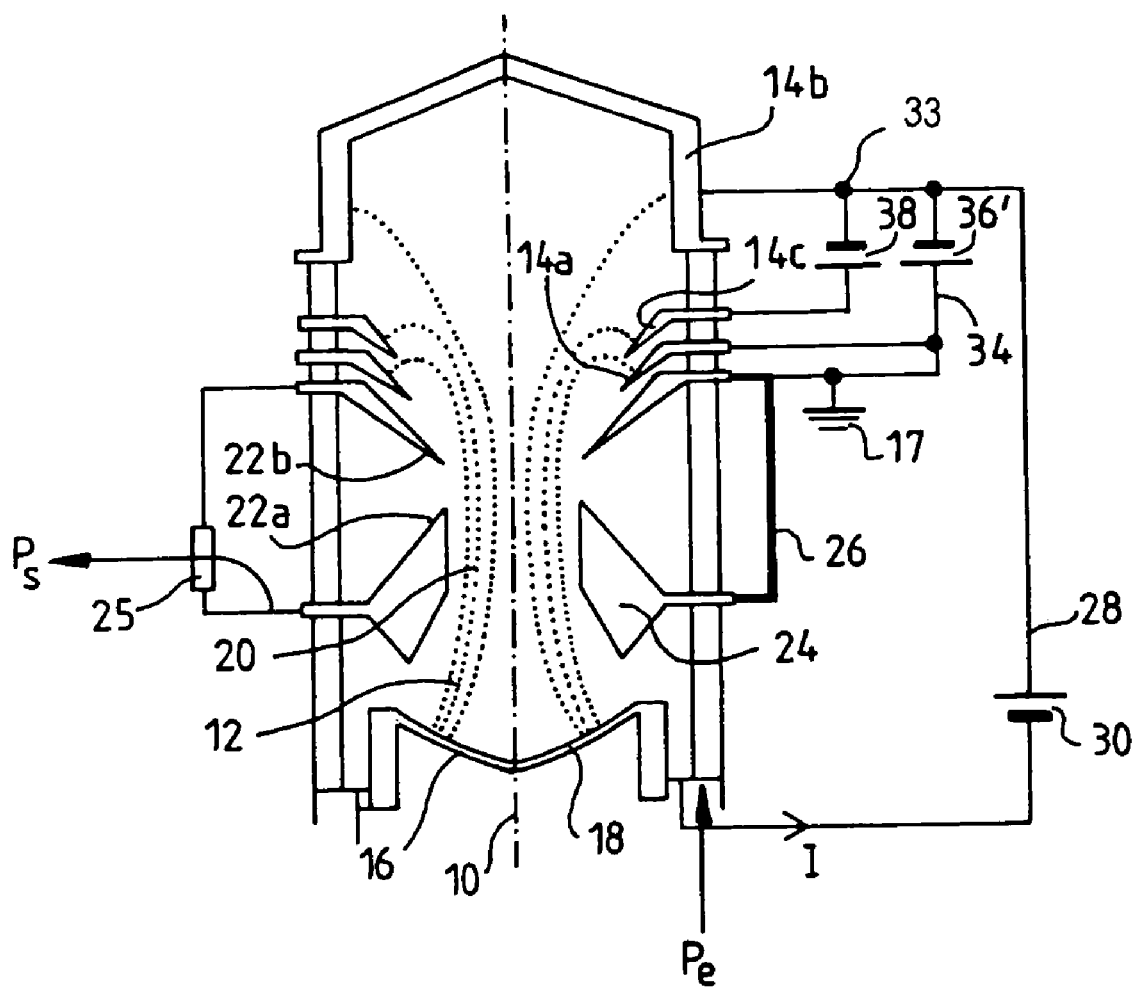
FIG. 3 shows schematically an amplifier with an inductive output electronic tube comprising three collectors and with voltage sources disposed according to the invention.
Figure 4:
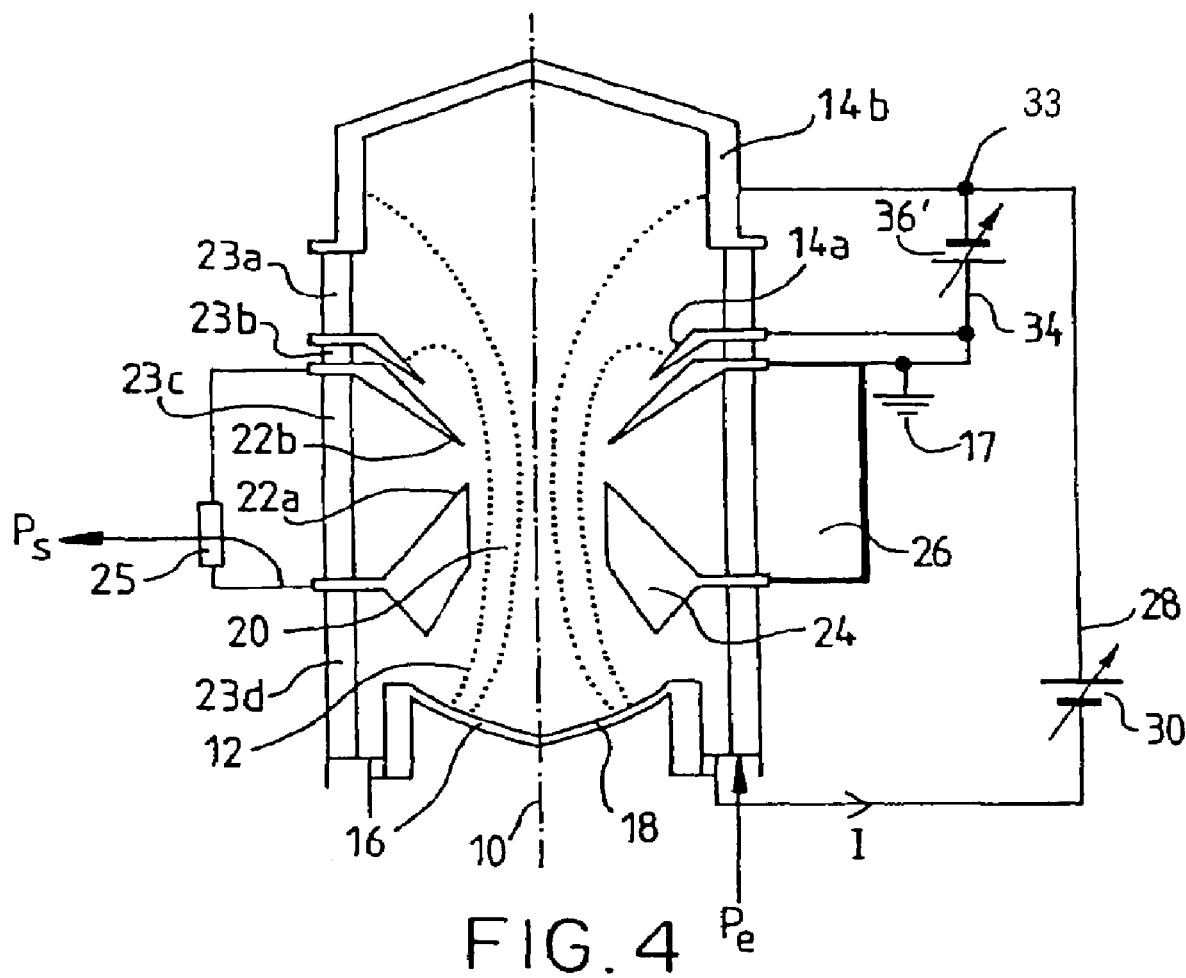
FIG. 4 shows schematically an amplifier with an inductive output electronic tube comprising two collectors and with variable voltage sources disposed according to the invention.

In FIG. 3, an exemplary embodiment of the invention is shown in the case of a tube comprising a third collector 14c in addition to the two collectors 14a and 14b of the preceding figure. The electrical configuration is the same as in the example in FIG. 2, with an additional DC voltage source 38, for example of 6 kV, whose positive pole is connected to the collector 14c. The negative pole of this voltage source 38 is connected to the collector 14b. This DC voltage source 38 is in series with the voltage source 30. The point 33, common to the three voltage sources 38, 36' and 30, is situated at the collector 14b, in other words at the one furthest from the cathode.

The overall voltage source for the collector 14c is 26 kV+6 kV, equal to 32 kV. The potential difference between the two collectors 14c and 14b, in other words the depression voltage, cannot exceed the voltage of this source 38, here 6 kV. A current/voltage-limited voltage source can also be used for this source of low voltage value 38.

The invention may also be applied to frequency bands other than the UHF band, such as for example the following frequency bands: L (from 1 to 2 GHz), S (from 2 to 4 GHz), C (from 4 to 8 GHz), X (from 8 to 12.4 GHz), Ku (from 12.4 to 18 GHz), K (from 18 to 26.5 GHz), Ka (from 26.5 to 40 GHz), etc.

Another subject of the invention is a transmitter comprising such an amplifier. This is, for example, a terrestrial analog or digital television signal transmitter.

The invention claimed is:

1. An amplifier, comprising:
   an electron tube with an axial electron beam, provided with a cathode and at least two collectors; and
   at least two DC voltage sources, each collector being directly connected to a respective one of the at least two DC voltage sources having a potential difference therebetween such that, the further the collector is from the cathode, the lower the potential difference between this collector and the cathode,
   wherein the at least two DC voltage sources are connected together to a lower potential collector whose potential difference with the cathode is lower than a potential difference of all other collectors of the at least two collectors with the cathode, but the potential difference of the lower potential collector is not zero,
   wherein said amplifier is free of any DC voltage source connected to at least one of said at least two collectors and not connected to said lower potential collector.

2. The amplifier as claimed in claim 1, wherein one of the at least two DC voltage sources is in series with an other of the at least two DC voltage sources.

3. The amplifier as claimed in claim 1, wherein all DC voltage sources are connected to at least one collector.

4. The amplifier as claimed in claim 1, wherein said at least two DC voltage sources connected together to said lower potential collector are connected together at a same potential.

5. The amplifier as claimed in claim 1, wherein one of the at least two voltage sources, defining a depression voltage between the lower potential collector and an other of said at least two collectors, is a current/voltage-limited voltage source.

6. The amplifier as claimed in claim 5, further comprising a feedback control unit for one voltage source of the at least two voltage sources situated between the lower potential collector and the cathode configured to keep the voltage source constant in a case of a fold-back of the depression voltage.

7. The amplifier as claimed in claim 1, wherein the at least two DC voltage sources are not synchronized when powering on the at least two DC voltage sources.

8. The amplifier as claimed in claim 1, wherein the at least two DC voltage sources are two voltage sources and the at least two collectors are two collectors.

9. The amplifier as claimed in claim 8, wherein a potential difference between the two collectors does not exceed a voltage of a lowest voltage source, from the two DC voltage sources, having a lowest voltage amount among the two DC voltage sources.

10. The amplifier as claimed in claim 1, wherein the at least two voltage sources are variable.

11. The amplifier as claimed in claim 10, wherein one of the at least two voltage sources, defining a depression voltage between the lower potential collector and an other of said at least two collectors, is a current/voltage-limited voltage source.

12. The amplifier as claimed in claim 11, further comprising a feedback control unit for one voltage source of the at least two voltage sources situated between the lower potential collector and the cathode configured to keep the voltage source constant in a case of a fold-back of the depression voltage.

13. A transmitter comprising an amplifier according to claim 10.

14. The amplifier as claimed in claim 1, wherein the tube is configured to operate in one of the UHF, L, S, C, X, Ku, K, and Ka bands.

15. The amplifier as claimed in claim 1, wherein the tube is one of an inductive output tube and a klystron.

16. A transmitter comprising an amplifier according to claim 1.

17. The amplifier as claimed in claim 1, wherein the at least two DC voltage sources are three voltage sources and the at least two collectors are three collectors.

* * * * *

UNITED STATES PATENT AND TRADEMARK OFFICE
CERTIFICATE OF CORRECTION

PATENT NO. : 7,474,148 B2  Page 1 of 1
APPLICATION NO. : 10/571113
DATED : January 6, 2009
INVENTOR(S) : Bel It is certified that error appears in the above-identified patent and that said Letters Patent is hereby corrected as shown below:

On the title page, Item (87), the PCT Publication number is incorrect. Item (87) should read as:

--(87)  PCT Pub. No. WO2005/038848
PCT Pub. Date: Mar. 31, 2005--

Signed and Sealed this

Seventeenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,474,148 B2 Page 1 of 1
APPLICATION NO. : 10/571113
DATED : January 6, 2009
INVENTOR(S) : Bel It is certified that error appears in the above-identified patent and that said Letters Patent is hereby corrected as shown below:

On the title page, Item (87), the PCT Publication number is incorrect. Item (87) should read:

Item -- (87) PCT Pub. No.: WO2005/038848
 PCT Pub. Date: April 28, 2005 --

Signed and Sealed this

Thirtieth Day of June, 2009

JOHN DOLL
*Acting Director of the United States Patent and Trademark Office*